(12) United States Patent
Bailey

(10) Patent No.: US 10,309,241 B2
(45) Date of Patent: Jun. 4, 2019

(54) COMPOUND FILLET VARYING CHORDWISE AND METHOD TO MANUFACTURE

(71) Applicant: Rolls-Royce Corporation, Indianapolis, IN (US)

(72) Inventor: Patrick E. Bailey, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 341 days.

(21) Appl. No.: 15/066,646

(22) Filed: Mar. 10, 2016

(65) Prior Publication Data

US 2016/0265551 A1 Sep. 15, 2016

Related U.S. Application Data

(60) Provisional application No. 62/131,463, filed on Mar. 11, 2015.

(51) Int. Cl.
*F01D 5/14* (2006.01)
*F01D 9/04* (2006.01)
(Continued)

(52) U.S. Cl.
CPC ............. *F01D 9/041* (2013.01); *F01D 5/141* (2013.01); *F01D 5/143* (2013.01); *F04D 27/009* (2013.01); *F04D 29/522* (2013.01); *F04D 29/542* (2013.01); *F04D 29/544* (2013.01); *F05D 2220/32* (2013.01); *F05D 2220/36* (2013.01); *F05D 2230/10* (2013.01); *F05D 2240/121* (2013.01); *F05D 2240/122* (2013.01);
(Continued)

(58) Field of Classification Search
CPC ........ F01D 5/141; F01D 9/041; F04D 29/544; F05D 2240/123; F05D 2240/124; F05D 2260/941
See application file for complete search history.

(56) References Cited

U.S. PATENT DOCUMENTS 6,181,978 B1 * 1/2001 Hinds ..................... G06T 17/20
700/182
6,190,128 B1 * 2/2001 Fukuno ................... F01D 5/141
416/223 A (Continued)

FOREIGN PATENT DOCUMENTS

EP         1731712 A1    12/2006
WO      2010054950 A1    5/2010
WO      2014113043 A1    7/2014

OTHER PUBLICATIONS

EP Search Report for EP-161592373, dated Jul. 27, 2016.

*Primary Examiner* — Ninh H. Nguyen
(74) *Attorney, Agent, or Firm* — Fishman Stewart PLLC

(57) ABSTRACT

An improved structure and method of manufacturing a structure such as a guide vane for a gas turbine engine includes an improved guide vane having a stress transition section called a fillet that is positioned between an airfoil and a hub. The fillet includes a constant radius section and a compound radius portion that is collectively configured to handle the stress loads of the guide vane as well as to provide aerodynamic efficiencies. An improved method of manufacturing an airfoil is provided that employs a single pass manufacturing process whereby a single tool is used to generate a resulting fillet having a constant radius and compound radius portion.

20 Claims, 5 Drawing Sheets

(51) Int. Cl.
*F04D 29/54* (2006.01)
*F04D 27/00* (2006.01)
*F04D 29/52* (2006.01)

(52) U.S. Cl.
CPC .... *F05D 2240/304* (2013.01); *F05D 2240/80* (2013.01); *F05D 2260/941* (2013.01); *Y02T 50/673* (2013.01)

(56) References Cited

U.S. PATENT DOCUMENTS

| | | |
|---|---|---|
| 6,419,446 B1 | 7/2002 | Kvasnak et al. |
| 6,851,924 B2 | 2/2005 | Mazzola et al. |
| RE39,479 E | 1/2007 | Tressler et al. |
| 8,047,787 B1 | 11/2011 | Liang |
| 8,206,095 B2 * | 6/2012 | Parker ................ F01D 5/14 415/191 |
| 8,794,912 B2 | 8/2014 | Nilsson et al. |
| 8,834,129 B2 | 9/2014 | Barnes et al. |
| 9,920,633 B2 * | 3/2018 | Bergman ............ F01D 5/147 |
| 2009/0246032 A1 | 10/2009 | Stone et al. |
| 2010/0284815 A1 | 11/2010 | Parker et al. |
| 2013/0243580 A1 | 9/2013 | Hayford et al. |
| 2016/0245103 A1 * | 8/2016 | Gimat ................ B29B 11/16 |

* cited by examiner

COMPOUND FILLET VARYING CHORDWISE AND METHOD TO MANUFACTURE

CROSS-REFERENCE TO RELATED APPLICATIONS

This application claims priority to U.S. Provisional Patent Application No. 62/131,463 filed on Mar. 11, 2015, the contents of which are hereby incorporated by reference in its entirety.

FIELD OF TECHNOLOGY

The present disclosure relates to an improved structure and method of manufacturing a structure such as a guide vane for a gas turbine engine, and more particularly, to an improved guide vane having an improved stress transition section between an airfoil and a hub, as well as an improved method of manufacturing an airfoil having a multiple radius fillet.

BACKGROUND

An aircraft may employ a plurality of engines about the airframe for imparting thrust to propel the aircraft. The types of engines employed on an aircraft vary based upon the desired performance and in commercial airliners, for example, the preferred choice of propulsion could be a gas turbine engine. One style of gas turbine engine is a turbofan which includes a forward fan, a compressor, a combustor, and a turbine.

Airflow is generated by the fan which provides added thrust and pressurized airflow. The pressurized airflow is separated into a core air flow path and a bypass air flow path. The air is introduced to the compressor where the air is compressed in a flow path containing one or more compressor stages where the compressed air is then introduced into the combustor where it is then mixed with pressurized fuel and ignited. The fan bypass air traverses downstream from the fan and is directed over a static outlet guide vane structure to where the bypass air then may be ejected over the nozzle or redirected for other deployment. The outlet guide vane structure is connected at its outer tip to a fan case and at its innermost point to a hub which in turn is secured to other structures in the compressor flow path region.

The outlet guide vane structure serves to de-swirl the fan by-pass air as well as carry the load bearing forces for the front end of the engine. As such the outlet guide vane structure should be configured to meet the aerodynamic requirements for de-swirling the by-pass air as well as be configured to provide the structural shape and design characteristics to carry engine loads in the event of a fan blade off event, fatiguing, etc. In addition, substantial stresses are placed on guide vanes at the joint where the airfoil interfaces with the hub and if not properly dealt with, could cause fatigue and stress fractures. Accordingly, an improved guide vane assembly would be helpful to overcome the challenges in the technology.

The method of manufacturing outlet guide vanes traditionally employs a machining process where multiple tools may be advanced multiple times over a surface of raw material in order to cut the complex geometry of the fillet radius that intersects the hub and airfoil. This process is very time-consuming as each elevation pass of the machining process increases the processing time to complete the final product. It would be helpful to improve the manufacturing process by reducing the processing time all the while improving the quality of the fillet. By reducing the processing time manufacturing efficiencies are realized which results in significant cost savings.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

Figure 1:
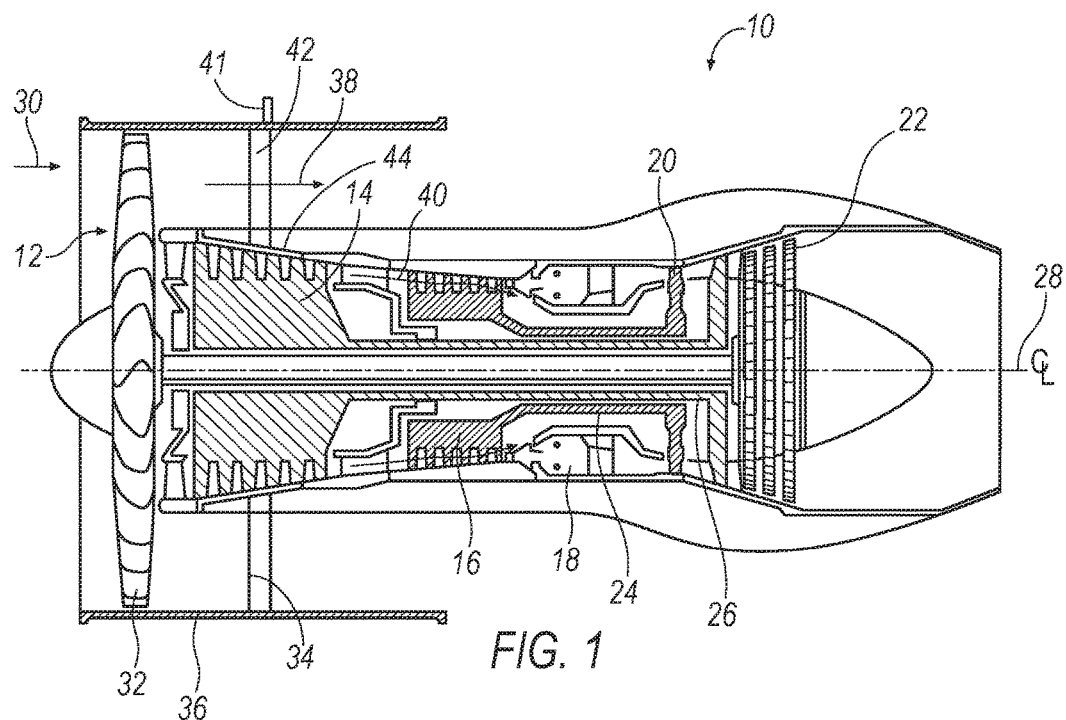
FIG. 1 schematically illustrates a gas turbine engine as one example of where the present disclosure may be utilized.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

DETAILED DESCRIPTION

The present improvement provides enhanced stress relief at the outermost attachment points of the outlet guide vane where they transition to the hub of the machine. By modifying the structure and method in which the airfoil transitions into the hub of the vane structure, the localized stresses are reduced which are beneficial to the performance and life of the guide vane. The resulting improved transition from the airfoil to the hub provides a vane structure that more efficiently distributes stress.

One exemplary guide vane includes a plurality of airfoils spaced around the perimeter of a hub. The intersection of each airfoil at the hub includes a fillet extending chordwise from the leading edge to the trailing edge of the airfoil. The fillet near the leading edge includes a constant radius R1 extending axially towards the trailing edge. The constant radius R1 fillet transitions chordwise into a compound fillet having a radius R2 that extends towards the trailing edge. It will be appreciated that the improved structure could be used in other locations of a gas turbine engine as well as other machinery where it is helpful to improve the integrity of joints or fillets where two or more structures connect. Accordingly, this disclosure is not limited to guide vanes for gas turbine engines.

An exemplary method of manufacturing is provided that controls the orientation of a tool bit by allowing the operator to make a single pass against the material to produce the desired fillet having the radius R1 and R2 at the desired locations. A novel single tool bit contains R1 and R2 which permits a constant radius R1 to be machined into the material during a portion of the pass of the machining process. During that same pass the machine advances the tool bit to cut the material with a radius of R2 to cut a compound radius at yet another portion of the fillet. The tool bit may be varied in order to vary the radial height at which the second fillet intersects the vane wall. Setting this height allows one to taper into and out of a compound fillet while processing a single pass with the tool. This novel manufacturing process reduces the amount of time it takes to cut a single fillet for guide vanes without having to change tools. It will be appreciated that the novel manufacturing method may be used in other applications where it is desired to improve the quality of a fillet between more than one structure. It is further contemplated that the tool may include a plurality of radii, such as but not limited to R1, R2, R3, . . . etc., so as to permit the machining of a plurality of radii into one material, all the while using one tool for a single pass during a machining operation.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 that is located within an annular duct 34, which in part is circumscribed by fan case 36 that extends axially. The ambient air 30 is separated into a bypass airflow stream 38 and core gas stream 40. The bypass airflow stream 38 provides engine thrust while the core gas stream 40 is directed to the combustor 18 where it is mixed with fuel and combusted and then directed to the high pressure turbine 20 for generating work. The gas turbine engine 10 further includes an improved engine structure called an outlet guide vane assembly 42 that is located downstream of the rotor 32 and it is spaced between the fan case 36 and the compressor 14. The outlet guide vane assembly 42 is a load carrying structure as well as it performs the task of de-swirling the fan bypass air 38 that traverses the duct 34. An engine mount 41 secures the vane assembly 42 to the fan case 36 using conventional means.

Figure 2:
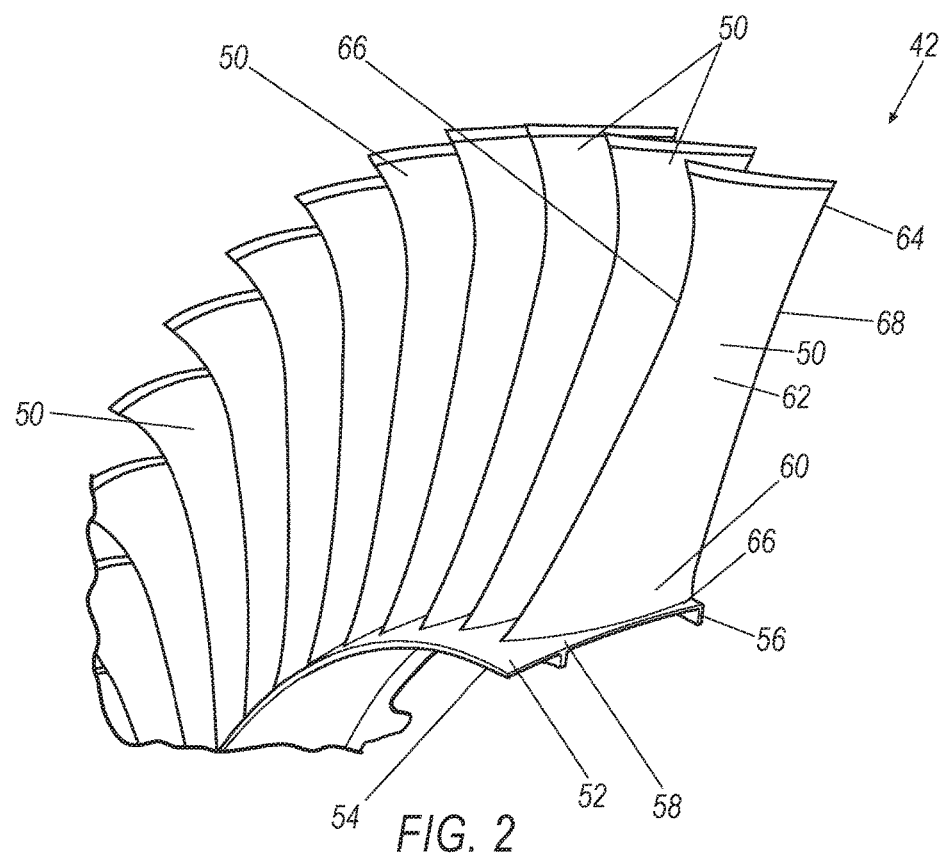
FIG. 2 is a perspective view of one section of an outlet guide vane assembly that may be used in concert with the machine depicted in FIG. 1.

FIG. 2 illustrates a partial perspective view of a section of the guide vane assembly 42, however the assembly has been removed from the engine depicted in FIG. 1. A plurality of airfoils 50 extend circumferentially around the circumference of a centrally located hub 52. The airfoil is unitary with the hub 52 and they are welded via a sophisticated process. The hub 52 includes a leading portion 54 and a trailing portion 56 with axially extending surface 58 extending there between. Each airfoil structure 50 has an inner radial portion 60, a body 62 and a tip 64. Each inner radial portion 60 is connected to the surface 58 and a transition section 67 extends the axial distance in the space where the airfoil 50 interfaces with the hub 52. Each airfoil has a leading edge 66 and a trailing edge 68. The transition section 66 is a high stress region and the stress on the section 66 tends to increase in stress near the trailing edge 68. The outer tip 64 of the airfoil 50 is connected to the inner surface of the fan case 36 so as to be rigidly secured to one another. The resulting guide vane assembly 42 is a load carrying structure and forces are transferred from the engine mount 41, fan case 36, through the guide vane assembly 42, and then to the compressor case 44.

It will be appreciated that the guide vane assembly 42 includes the airfoils 50 that extend radially outward of the hub 52. In essence the radially extending outward portions are radial extending structures or extensions of the hub 52. During the manufacturing process the hub 52 may be formed with the extensions/airfoils 50 being welded to an outer surface of the hub. In aircraft applications there are other scenarios where an outwardly extending member extends from a shaft. For example, a blade for a turbine 20, 22, may extend from a shaft 24, 26. Thus, the disclosure contemplates improvements in fillets where vanes, blades, extension member(s), etc., extend from another structure.

Figure 3:
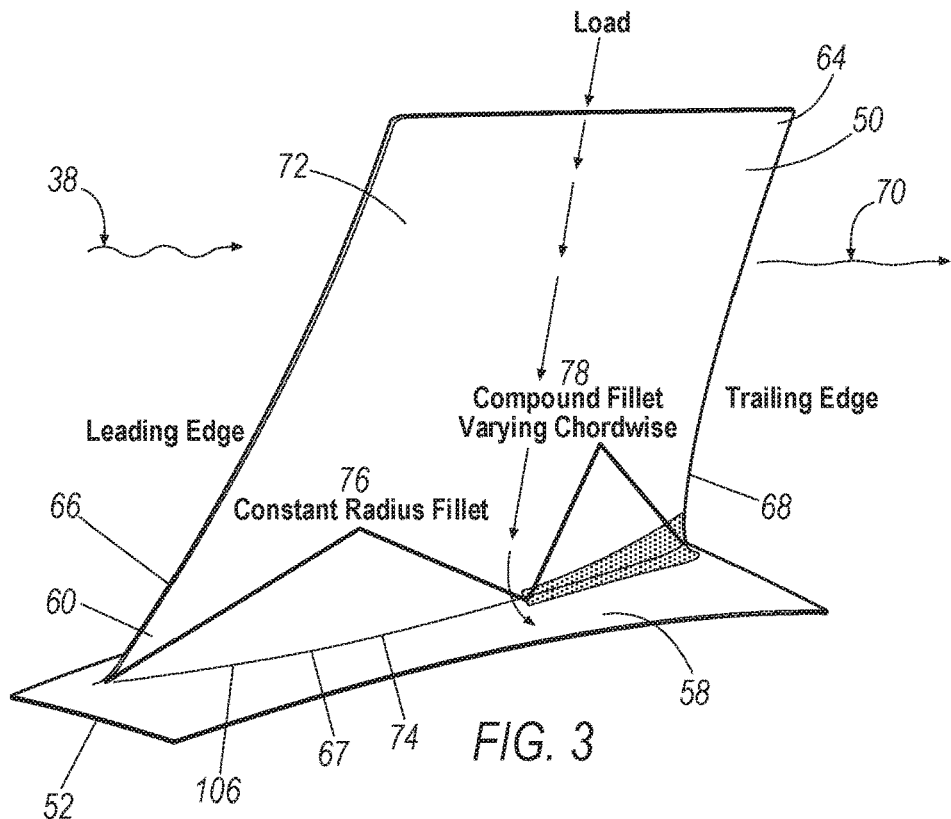
FIG. 3 illustrates an enlarged perspective view of one outlet guide vane, showing one exemplary guide vane that could be used with the assembly depicted in FIG. 2.

With reference to FIG. 3, a single airfoil 50 is depicted for use in connection with the outlet guide vane structure 42 that is shown in FIG. 2. The guide vane structure 42 includes a hub 52 with an axially extending surface 58 which provides a smooth continuous surface from the leading edge 66 of the airfoil to the trailing edge 68 of the airfoil. The airfoil 50 is aerodynamically designed to include a surface 72 whereby by-pass airflow 38 is received on the leading side of the surface and conditioned air flow 70 that is de-swirled exits the airfoil 50. The surface 72 may be aerodynamically configured so as to provide other de-swirling effects.

The bypass air 38 further traverses from the leading edge 60 to the trailing edge 68 at the transition section 67 which is the region where the hub 52 and the airfoil 50 meet. The airflow extending chordwise along the transition section 67 is impacted by the surface contour of the fillet 74 that intersects the innermost radial portion 60 of the airfoil 50 and the axially extending surface 58 of the hub 52. In one exemplary embodiment of the present disclosure, a constant radius fillet 76 is located near the leading edge 66 portion of the airfoil 50, while a compound radius fillet 78 is located near the trailing edge 68 of the airfoil 50. A transition zone 80 defines the space between the constant radius fillet 76 and the compound radius fillet 78. In the exemplary embodiment depicted, the constant radius fillet 76 extends approximately two thirds chordwise of the airfoil, while the compound radius fillet 78 extends approximately the remaining third of the airfoil. It will be appreciated that the length of the fillets 76 and 78 may vary to have different proportions relative to one another. It will also be appreciated that more than 2 different fillets having different radii may traverse chordwise the airfoil 50.

Figure 4:
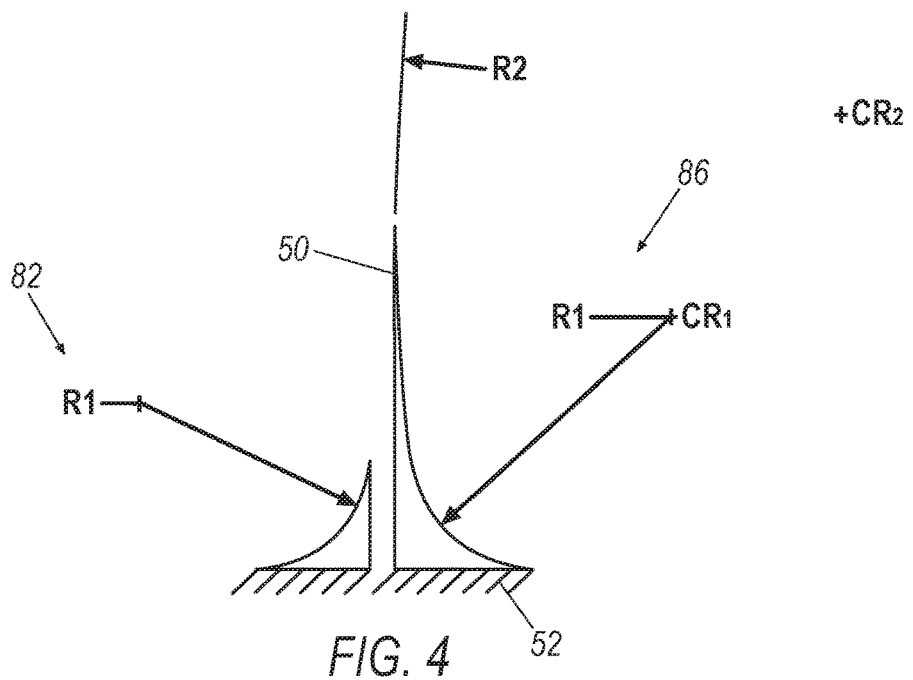
FIG. 4 illustrates a schematic diagram of a machine cutting path having values R1 and R2 where a constant fillet radius R1 and compound fillet radius R2 is employed.

FIG. 4 illustrates a schematic diagram of the fillets that are employed when manufacturing the outlet guide vane 42. It will be appreciated that fillets having other radii may be employed. The constant radius fillet 76 employs a radius referred to herein as R1. Likewise, the compound radius fillet 78 has a radius referred to herein as R2, where R2>R1. The centerpoint CR1 is the centerpoint for the R1 radius. Likewise the centerpoint CR2 is the centerpoint for the R2 radius. The constant radius fillet 76 is located substantially near the leading edge 60 of the airfoil 50, and it is located on both the pressure side and suction side of airfoil 50. The left side 82 of FIG. 4 depicts a radius R1 for the constant radius fillet 76 that can be implemented on the leading edge 60 portion of the airfoil 50. A machine tool bit 84 (see FIG. 5) traverses along a path starting from the leading edge 60 towards the transition zone 80. At or near the transition zone 80, the tool bit 84 is repositioned by the machine/operator to continue cutting material whereby a compound radius fillet 78 is then generated. See the right side 86 of FIG. 4 where a compound fillet radius schematic is depicted. Here, after the transition zone 80, a compound fillet having a radius R2>R1 is machined into the airfoil 50 and the hub 52 so as to generate a compound fillet. The compound fillet extends from the transition zone 80 towards the trailing edge 68 of the airfoil 50. It will be appreciated that the compound fillet may have a radius other than that depicted herein, which is merely exemplary in nature.

Figure 5:
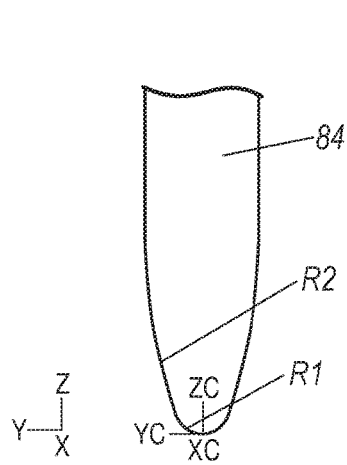
FIG. 5 illustrates an exemplary tool that may be used to machine the fillet shown in the FIG. 3 outlet guide vane structure.

FIG. 5 depicts a novel tool bit 84 that may be employed for machining the fillet surfaces that are generated in the FIG. 3 device. The bit 84 may be used in connection with a CNC machine and it is held by a chuck. The radius R2 is greater than the radius R1 as can be seen in FIG. 5. It will be appreciated that the actual values of R1 and R2 may differ from the exemplary depictions illustrated herein. Further, it will be appreciated that a tool bit 84 having a plurality of radii such as R3, R4, etc. may be contemplated. Thus a single tool bit 84 having multiple radii is contemplated herein. A single tool bit, such as bit 84, is used during a single machining pass from the leading edge 60 to the trailing edge 68 which results in fillets that define the transition section 67. The bit 84 is made from materials that are necessary for cutting aircraft components such as outlet guide vane air foils 50.

Figure 6:
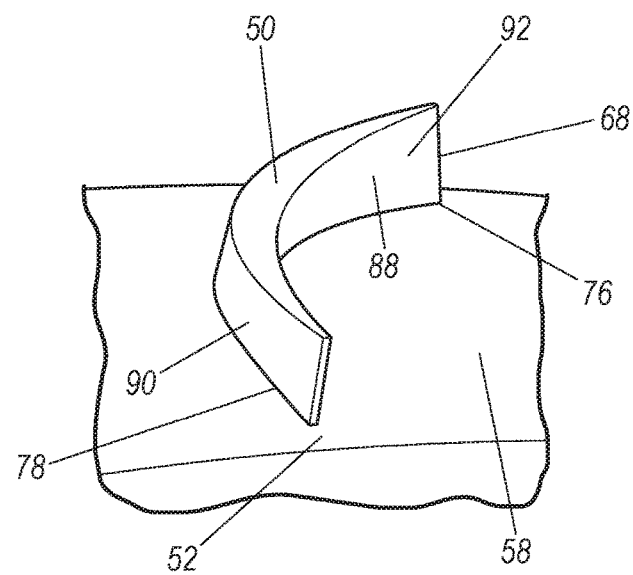
FIG. 6 illustrates a front view of the contour of a guide vane as well as the pressure side and suction side of the airfoil.

FIG. 6 illustrates a partial enlarged perspective view of one portion of the guide vane airfoil 50 relative to the surface 58 of the hub 52. The constant radius fillet 76 is located on both the pressure side 88 and the suction side 90, starting from the leading edge 60. Likewise, the compound radius fillet 78 is located on both the high pressure side 88 and the suction side 90 at a location towards the trailing edge 68 of the airfoil 50.

Figure 7:
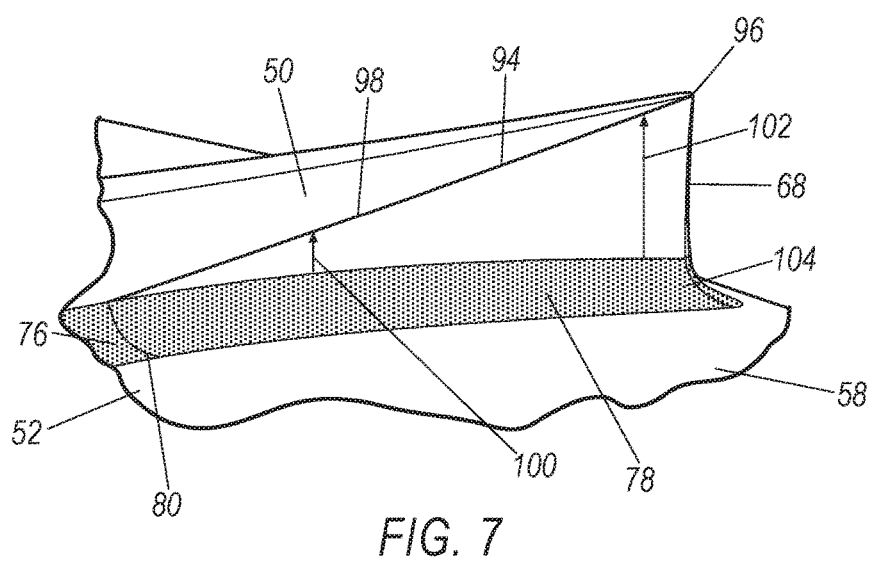
FIG. 7 illustrates a side view of the tangency path of radius R2 as the tool traverses the part being machined.

FIG. 7 illustrates an enlarged partial perspective view of the FIG. 3 airfoil 50, focusing however on the trailing edge 68 portion of the airfoil. The airfoil 50 is shown relative to the axially extending surface 58 near the transition zone 80; the point at which the constant radius fillet 76 transitions into the compound radius fillet 78. A tangent line 94 is shown traversing from the transition zone point 80 towards an upper end point 96 that intersects with the trailing edge 68. The tangent line 94 defines a tangency path 98 in which the tool 84 may travel as it machines the compound radius fillet 78. The radius height 100 increases along the tangency path 94 to where an increased radius height 102 may be achieved. By varying the heights 100 and 102, the heights of tangency produces a varying compound fillet 78. By setting this height 100 and 102, this allows an operator to vary the taper into and out of the compound fillet 78 all during a single pass of the tool 84 as it traverses chordwise of the airfoil 50 and hub 52. It will be appreciated that other radius heights 100 and 102 may be contemplated so as to provide other compound fillet designs. The resulting compound fillet 78 more effectively transition stresses from the airfoil 50 into the hub 52. This is particularly helpful as the high stress area 104 is often located near the intersection of the trailing edge 68 and the axially extending surface 58 of the hub.

Figure 8:
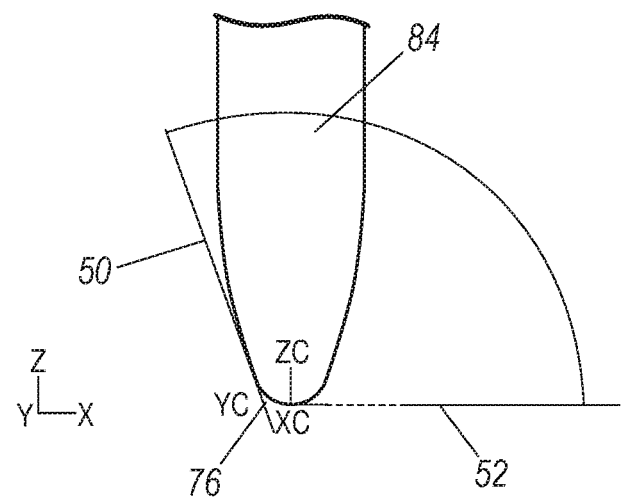
FIG. 8 illustrates the geometry of the positioning of the tool relative to the vane during the cutting of the constant fillet radius R1.

FIG. 8 illustrates the orientation of the tool bit 84 relative to the surface of the guide vane 50 and the hub 52. This particular orientation depicts the orientation of the bit 84 during the machining process of generating the constant radius fillet 76. During this portion of the manufacturing process the orientation of the tool bit 84 is initiated near the leading edge 66 of the airfoil. As the tool 84 traverses chordwise towards the trailing edge 68 of the airfoil 50, it transitions into the transition zone 80 and then indexes to a position shown in FIG. 9. The FIG. 9 representation is a depiction of the tool orientation relative to the vane 50 and the hub 52 during the construction of a compound radius fillet 78.

Figure 9:
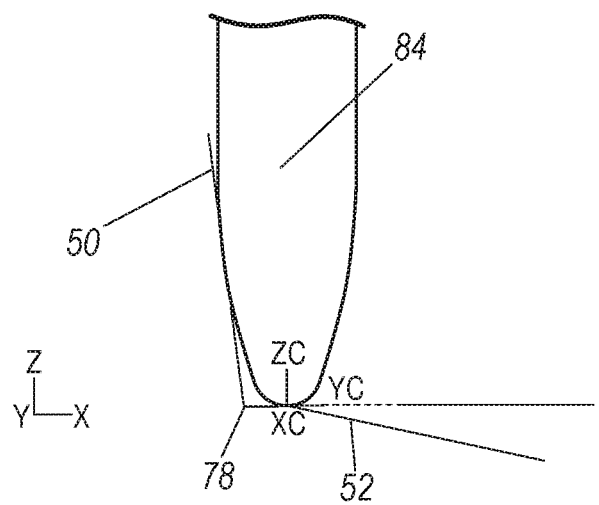
FIG. 9 illustrates the geometry of the positioning of the tool relative to the vane during the cutting of the compound fillet radius R2.

FIG. 9 illustrates an example of the positioning of the bit 84 that could be employed while manufacturing a compound radius fillet 78. Here the radius R2 of the bit 84 engages the surface of the airfoil 50 which results in a fillet 78 having increased mass.

Figure 10:
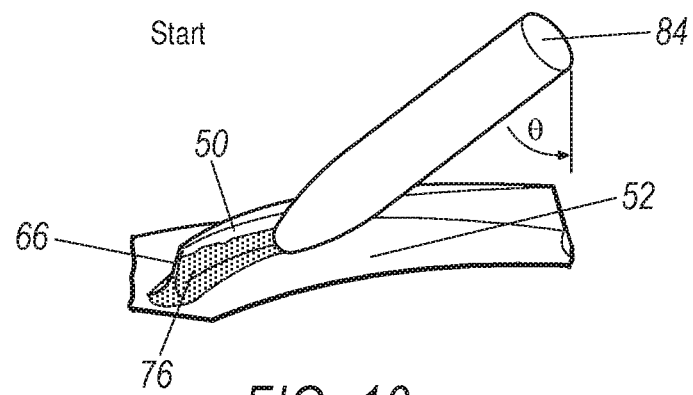
FIG. 10 illustrates the tool positioning during the machining of the constant fillet radius R1.

FIG. 10 illustrates a schematic diagram of one potential orientation of the bit 84 relative to the hub 52 and the airfoil 50 of the outlet guide vane 42 during a first manufacturing step of the manufacturing process. For example, this orientation could be employed when making the constant radius fillet 76 that could initially be formed at the leading edge 66 of the airfoil. In this particular instance, the bit 84 orientation is similar to that depicted in the FIG. 8 schematic representation.

Figure 11:
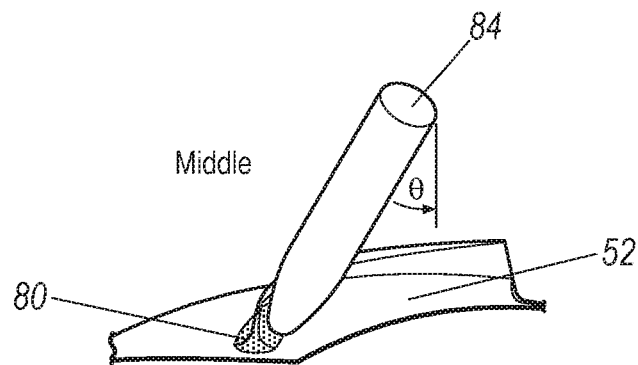
FIG. 11 illustrates the tool positioning during the machining of the fillet radius at the transition zone which is the section of the fillet where it transitions between R1 and R2.

FIG. 11 illustrates a potential bit 84 orientation during the machining of the transition zone 80 portion of the fillet manufacturing process. Here, the bit 84 is shown relative to the surface of the hub 52. This represents one potential orientation of the bit 84 in the middle or transitional phase of the manufacturing process, which is the area extending between the constant radius fillet and the compound radius fillet. At the position shown, the compound fillet is not at its tallest radial height. Such height increases as the bit 84 advances towards the trailing edge.

Figure 12:
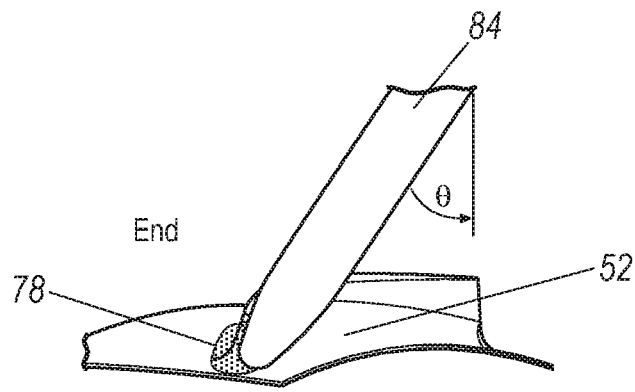
FIG. 12 illustrates the tool positioning during the machining of the compound fillet radius R2.

FIG. 12 illustrates the possible positioning of the bit 84 when manufacturing the fullest extent of the compound radius fillet 78. In other words, when it has an increased radial height. Here the bit 84 is positioned relative to the hub 52 in order to form a compound radius fillet 78 which could be located near the trailing edge of the airfoil 50. The orientation of the bit 84 as depicted in FIGS. 10, 11, and 12, depict the passing of the bit 84 along a single pass during one step of the manufacturing process. Thus, the resulting fillet varying chordwise 74 is generated in a single pass of the tool bit, without the need to exchange multiple tools, and without the need to make multiple passes to generate the final fillet. It will be appreciated that controlling the orientation of the bit with respect to the machine feature, i.e. the guide vane 42 in this instance, can be accomplished in several ways. For example, the guide vane could be oriented and moved relative to a bit that is maintained static. By contrast, the guide vane could be held static, while the bit 84 is dynamic and moves relative to the surfaces of the guide vane. The resulting machine structure is produced having both a constant radius fillet and a compound radius fillet, depending upon the orientation of the tool to the machine structure. This process may be employed in various manufacturing operations where it is desirable to provide an improved fillet construct. It will further be appreciated that an improved fillet construct may be employed having more than just 2 radii that may be formed during a single pass chordwise of the structure. Such could be accomplished by providing a bit 84 having multiple radii constructed therein, such R3, R4, etc.

The method of manufacturing an outlet guide vane structure 42 will now be presented. First, a tool is created having a compound fillet of R1 and R2 where R2>R1. The actual determination of the R1 and R2 values is determined based upon the desired engineering criteria so that a resulting fillet is generated that meets both aerodynamic preferences as well as meeting engineering stress load requirements. In this regard, a tool bit similar to that shown in FIG. 5 may be contemplated.

The next step is to establish the pressure and suction side surfaces of the vane and the geometry of the vane. This construct is shown in the FIG. 6 embodiment where the suction side 90 and the pressure side 88 of the airfoil 50 have been configured.

The next step is to establish the tangency path 94 of the R2 (second radius) of the tool bit 84 with respect to the pressure and suction side surfaces of the airfoil 50. This is depicted in the FIG. 7 illustration where the tool path for the bit 84 has been demonstrated where the positioning of the tool bit 84 for R2 is shown to preferably traverse the tangency path 94. By increasing the radius height 100 and 102 as the tool 84 traverses along the tangency path 94, the compound fillet varies chordwise.

The next step is to now create a tool path to maintain the tangency of R2 of the tool bit 84 with the airfoil 50 along a path while maintaining the tangency of R1 relative to the hub 50. This is best seen in the schematic depiction of FIG. 8 and FIG. 9.

The next step is to now machine the fillet along the tool path that has been created in order to produce a structure in a single pass. The tool orientations as depicted in FIGS. 10, 11 and 12, illustrate one particular example of how the machine can advance the tool bit 84 along the created tool path in order to produce a single feature, i.e. an outlet guide vane 42, all in a single pass of the tool bit 84. This manufacturing process allows an operator to create a constant radius fillet, and a compound fillet, varying chordwise, in a single manufacturing pass.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. An extension member for an engine comprising:
   an airfoil having a leading edge portion and a trailing edge portion, the airfoil further including an aerodynamic surface extending between the leading and trailing edge portions;
   a hub positioned radially inward from the airfoil, the hub includes a first portion, a second portion, and an axially extending portion extending between the first and second portions; and
   a fillet extending axially from the leading edge portion of the airfoil to the trailing edge portion of the airfoil, the fillet including a first radius R1 and a second radius R2, the first radius R1 is a constant radius and begins at the leading edge portion of the airfoil and extends towards a transition point, the second radius R2 when combined with the first radius R1 is a compound radius and begins near the transition point and continues towards the trailing edge portion of the airfoil, wherein the first radius R1 and the second radius R2 extend around a perimeter of the airfoil.

2. The extension member as claimed in claim 1, further comprising a fan casing, the fan casing and extension member are connected to one another at an outer radial portion of the extension member.

3. The extension member as claimed in claim 1, further comprising a gas turbine engine, the extension member directs airflow that passes through the gas turbine engine, wherein the extension member is a vane or a blade.

4. The extension member as claimed in claim 1, wherein the constant radius of the fillet extends from the leading edge portion to the transition point on both a pressure side and a suction side of the airfoil, and the compound radius of the fillet extends from the transition point to the trailing edge portion on both the pressure side and the suction side of the airfoil.

5. The extension member as claimed in claim 1, further comprising a plurality of extension members positioned adjacent to one another to form an extension member assembly, the extension member assembly operates to receive bypass air and de-swirl the bypass air.

6. The extension member as claimed in claim 1, wherein the first radius R1 and the second radius R2 have a value where R2>R1.

7. The extension member as claimed in claim 1, wherein a portion of the fillet where the second radius R2 is located has more mass than the portion of the fillet where the first radius R1 is located.

8. The extension member as claimed in claim 1, wherein the compound radius of the fillet begins axially downstream of the constant radius near the transition point and extends to the trailing edge portion of the airfoil.

9. A vane assembly for an engine comprising:
   an airfoil having a leading surface and a trailing surface;
   a hub that has an outer surface, the hub is circular shaped and the airfoil extends from the outer surface;
   a constant radius fillet extends axially and between the airfoil and the hub; and
   a compound radius fillet extends axially and between the airfoil and the hub;
   wherein the constant radius fillet and compound radius fillet circumscribe the airfoil, and wherein the constant radius fillet begins at the leading surface of the airfoil and extends on both a pressure side and a suction side of the airfoil.

10. The vane assembly for an engine as claimed in claim 9, wherein the constant radius filet defines a first radius R1 and the compound radius fillet defines a second radius R2, and wherein R2>R1.

11. The vane assembly for an engine as claimed in claim 10, wherein the compound radius fillet has the first radius R1 and the second radius R2.

12. The vane assembly for an engine as claimed in claim 9, wherein the compound radius fillet is located near the trailing surface of the airfoil, and is on both the pressure side and the suction side of the airfoil.

13. The vane assembly for an engine as claimed in claim 9, wherein the constant radius fillet extends chordwise about ⅔ of the distance of the airfoil, and the compound radius fillet extends about ⅓ of the distance of the airfoil.

14. A method of manufacturing a guide vane for an engine, comprising the following steps:
    providing a tool having a radius R1 and a radius R2;
    establishing pressure and suction side surfaces of a vane;
    establishing a tangency path for radius R2 of the tool with respect to the pressure and suction side surfaces of the vane;
    programming a machine to follow the tangency path so the tool advances to maintain the tangency of radius R2 of the tool with the surface of the vane while maintaining the tangency of radius R1 relative to a hub; and
    machining a fillet along the tangency path that has been created in order to produce a fillet structure m a single manufacturing pass;
    whereby R1 is a constant radius fillet, and R2 is a compound fillet, and the fillets vary chordwise.

15. The method of manufacturing as claimed in claim 14, whereby the machining step includes first machining a constant radius at a leading edge of the vane, and then indexing the tool relative to the vane, and then machining a compound radius towards a trailing edge of the vane.

16. The method of manufacturing as claimed in claim 15, further comprising the step of machining a transition fillet between the constant radius and compound radius portions of the fillet.

17. The method of manufacturing as claimed in claim 14, wherein the step of providing a tool includes determining the radius R2 based upon stresses that are exerted on a trailing edge portion of the vane.

18. The method of manufacturing as claimed in claim 14, wherein the step of machining a fillet includes either moving the tool relative to the vane, and/or moving the vane relative to the tool.

19. The method of manufacturing as claimed in claim 14, wherein the step of machining a fillet includes machining a fillet around an entire perimeter of the vane.

20. An extension member for an engine comprising:
    an airfoil having a leading edge portion and a trailing edge portion, the airfoil further including an aerodynamic surface extending between the leading and trailing edge portions;
    a hub positioned radially inward from the airfoil, the hub includes a first portion, a second portion, and an axially extending portion extending between the first and second portions; and
    a fillet extending axially from the leading edge portion of the airfoil to the trailing edge portion of the airfoil, the fillet including a first radius R1 and a second radius R2, the first radius R1 begins at the leading edge portion of the airfoil and extends towards a transition zone, the second radius R2 begins near the transition zone and continues towards the trailing edge portion of the airfoil, wherein the first radius R1 and the second radius R2 have a value where R2>R1.

* * * * *